(12) United States Patent
Chen et al.

(10) Patent No.: US 11,760,669 B2
(45) Date of Patent: Sep. 19, 2023

(54) FLAT MEMBRANE SUPPORT PLATE

(71) Applicant: GO HIGHER ENVIRONMENT GROUP CO., LTD., Beijing (CN)

(72) Inventors: Futai Chen, Beijing (CN); Yan Yang, Beijing (CN); Liqiang Bai, Beijing (CN)

(73) Assignee: GO HIGHER ENVIRONMENT GROUP CO., LTD., Beijing (CN)

( * ) Notice: Subject to any disclaimer, the term of this patent is extended or adjusted under 35 U.S.C. 154(b) by 493 days.

(21) Appl. No.: 17/048,613

(22) PCT Filed: Aug. 9, 2019

(86) PCT No.: PCT/CN2019/099912
§ 371 (c)(1),
(2) Date: Oct. 19, 2020

(87) PCT Pub. No.: WO2020/030079
PCT Pub. Date: Feb. 13, 2020

(65) Prior Publication Data
US 2021/0171374 A1  Jun. 10, 2021

(30) Foreign Application Priority Data

Aug. 9, 2018  (CN) .......................... 201810904223.9
Aug. 9, 2018  (CN) .......................... 201821279675.4

(51) Int. Cl.
*B01D 63/08* (2006.01)
*C02F 3/12* (2023.01)
(Continued)

(52) U.S. Cl.
CPC ............ *C02F 3/1268* (2013.01); *B01D 63/08* (2013.01); *B01D 69/10* (2013.01); *B01D 69/107* (2022.08);
(Continued)

(58) Field of Classification Search
CPC .............. C02F 3/1268; C02F 2103/005; C02F 2203/006; C02F 2307/08; B01D 63/08;
(Continued)

(56) References Cited

U.S. PATENT DOCUMENTS

| 5,482,625 A * | 1/1996 | Shimizu ................. B01D 61/18 210/488 |
| 6,126,819 A | 10/2000 | Heine et al. |
| 2011/0049038 A1 * | 3/2011 | Aerts ...................... C02F 1/444 210/321.75 |

FOREIGN PATENT DOCUMENTS

| CN | 102172477 | 9/2011 |
| CN | 104190263 | 12/2014 |

(Continued)

OTHER PUBLICATIONS

"International Search Report (Form PCT/ISA/210) of PCT/CN2019/099912," dated Oct. 15, 2019, with English translation thereof, pp. 1-6.

*Primary Examiner* — Pranav N Patel
(74) *Attorney, Agent, or Firm* — COOPER LEGAL GROUP, LLC

(57) ABSTRACT

A flat membrane support plate includes a connection portion, a honeycomb structural portion and a support portion. The connection portion is configured to connect a diaphragm to the flat membrane support plate in a sealing manner, is arranged at a periphery of the flat membrane support plate, and is provided with at least one water outlet. The honeycomb structural portion is arranged on the flat membrane support plate in an area enclosed by the connection portion, is provided with a first flow channel for communicating with an interior of the entire honeycomb structural portion and communicating the honeycomb structural portion with the water outlet. The support portion is configured for reinforcing the honeycomb structural portion and is arranged (Continued)

between the honeycomb structural portion and the connection portion.

9 Claims, 3 Drawing Sheets

(51) Int. Cl.
*B01D 69/10* (2006.01)
*B01D 61/18* (2006.01)
*C02F 103/00* (2006.01)
*B01D 29/00* (2006.01)

(52) U.S. Cl.
CPC .......... *B01D 29/0038* (2013.01); *B01D 61/18* (2013.01); *B01D 2201/04* (2013.01); *B01D 2311/2688* (2013.01); *B01D 2313/025* (2013.01); *B01D 2313/06* (2013.01); *C02F 2103/005* (2013.01); *C02F 2203/006* (2013.01); *C02F 2307/08* (2013.01); *Y02W 10/10* (2015.05)

(58) Field of Classification Search
CPC ...... B01D 69/10; B01D 69/107; B01D 61/18; B01D 2201/04; B01D 2311/2688; B01D 2313/025; B01D 2313/06; B01D 2311/04; B01D 2315/06; Y02W 10/10
See application file for complete search history.

(56) References Cited

FOREIGN PATENT DOCUMENTS

| | | |
|---|---|---|
| CN | 104307375 | 1/2015 |
| CN | 105984935 | 10/2016 |
| CN | 205710054 | 11/2016 |
| CN | 106630130 | 5/2017 |
| CN | 209005559 | 6/2019 |
| DE | 10021092 | 10/2001 |
| EP | 0585614 | 3/1994 |
| JP | S5340779 | 4/1978 |
| JP | H07100347 | 4/1995 |
| JP | H11235503 | 8/1999 |
| JP | 2004073898 | 3/2004 |

* cited by examiner

FLAT MEMBRANE SUPPORT PLATE

CROSS-REFERENCE TO RELATED APPLICATION

This application is a 371 of international application of PCT application serial no. PCT/CN2019/099912, filed on Aug. 9, 2019, which claims the priority benefit of China application no. 201810904223.9 and no. 201821279675.4, filed on Aug. 9, 2018. The entirety of each of the above mentioned patent applications is hereby incorporated by reference herein and made a part of this specification.

BACKGROUND

Technical Field

This application relates to the field of accessories for sewage treatment equipment, and more particularly, to a flat membrane support plate.

Description of Related Art

Membrane bioreactor (MBR) is a novel high-efficiency sewage treatment process that combines high-efficiency membrane separation technology with a conventional activated sludge process. A membrane separation device is used to replace a secondary sedimentation tank in the conventional activated sludge process, and a large number of microorganisms may be trapped. In turn, the types and the quantity of microorganisms in the system are greatly enriched, thus the sewage treatment capacity and efficiency are improved, and thereby, the effluent quality and the volume loading of the system are greatly improved. Compared to the conventional process, the present application possesses the advantages, such as smaller occupying area, more stable effluent quality, less sludge and easier operation.

The types of the membrane bioreactor are mainly composed of a flat membrane, a spiral-wound membrane and a hollow membrane. The flat membrane is used as a main type and is widely applied. A flat membrane element is the core component of the flat membrane, and each membrane element is generally composed of a support plate, a lining cloth, and a diaphragm.

The main shortcomings of the conventional flat membrane support plates are presented in the following several aspects. (1) In order to meet the requirement of large plane size, the support plate is required to have certain rigidity, and a thicker support plate structure is usually adopted, which becomes the main cost composition of a flat membrane element, and generally accounts for more than 70% of the cost of the membrane element. This is also the reason why the cost of the membrane element is high and the popularization is difficult. However, reducing the thickness of the plate causes insufficient rigidity and is insufficient to be vertically supported to keep a plane. (2) The large plane membrane elements are generally positioned by side edges (inserted into the U-shaped grooves) to keep the required spacing of the elements, for the plane with the large size, even so thick a plastic support plate is positioned only by the two side edges, deformation and upwarp inevitably occur in actual use, the spacing between every two adjacent membrane elements is changed and contacted at the upwarp portion due to deformation and upwarp, particularly, when the spacing is reduced, uneven flushing of air and water between the membrane elements occurs, sludge is accumulated to block the membrane surface, and the effluent flux is reduced. (3) Most of conventional rectangular support plates with the vertical direction far larger than the width are guided to the top through single-phase longitudinal guide grooves to discharge water, water needs to be pumped out through a pump during operation, gravity differential pressure operation substantially cannot be adopted, and therefore operation energy consumption is high. Even if suction drainage is adopted, due to unequal water pressure differences, suction force of upper and lower areas of a membrane surface is less likely to be objectively uniform, the effective utilization area of the membrane is not large, suction force of upper and lower points of the plane is not uniform, and the membrane surface is easily fouled to different degrees.

SUMMARY

Therefore, it is an object of the present application to overcome the technical problem that the transmembrane pressure difference between the conventional flat membrane support plates is large and the supporting strength and rigidity can be satisfied only when the plates are thickened and costs are increased, and further to provide a flat membrane support plate.

To this end, the present application provides a flat membrane support plate, which includes a connection portion, a honeycomb structural portion and a support portion. The connection portion is configured to connect a diaphragm to the flat membrane support plate in a sealing manner. The connection portion is arranged at a periphery of the flat membrane support plate, and provided with at least one water outlet. The honeycomb structural portion is arranged on the flat membrane support plate in an area enclosed by the connection portion. The honeycomb structural portion is provided with a first flow channel for communicating with an interior of the entire honeycomb structural portion and communicating the honeycomb structural portion with the water outlet. A hollow area of the honeycomb structural portion occupies 30-70% of an entire area of the flat membrane support plate. The support portion is configured for reinforcing the honeycomb structural portion and arranged between the honeycomb structural portion and the connection portion.

Further, the honeycomb structural portion includes a plurality of honeycomb cells, and each of the plurality of honeycomb cells includes a through-hole and a hole wall. The through-hole is formed inside the honeycomb cell and formed by an outer periphery of the hole wall. Adjacent through-holes are separated by the hole walls. The first flow channel is arranged on the hole wall of each of the honeycomb cells.

Further, the first flow channel is arranged at a junction of the hole walls of adjacent honeycomb cells. Liquids in the through-holes of two adjacent honeycomb cells are communicated with each other through at least two first flow channels.

Further, the first flow channel is a tapered through-hole or a tapered groove, and an opening of the first flow channel tapers inwardly from a surface of the flat membrane support plate.

Further, the honeycomb cell has a regular hexagonal cross section, and the first flow channel is arranged at a junction of the hole walls of three adjacent honeycomb cells. Or, the honeycomb cell is a honeycomb-like cell having a rectangular or diamond cross section, and the first flow channel is arranged at a junction of hole walls of four adjacent honeycomb cells.

Further, the support portion includes at least one support unit. The support unit is provided with a second flow channel, staggered longitudinally and laterally and communicated with the water outlet and the through-hole. The at least one support unit divides the honeycomb structural portion into a plurality of honeycombs communicated with each other.

Further, the support unit is a cross-shaped structure, and at least one cross-shaped structure is provided. The support unit includes a transverse barrier and a longitudinal barrier.

Further, the support unit has a hexagonal or a semi-hexagonal cross section. The plurality of honeycomb cells are partially or entirely nested in the support portion.

Further, a reinforcing rib is further provided between an inner circumference of the connection portion and an outer circumference of the honeycomb structural portion. The reinforcing rib is provided with a third flow channel, staggered longitudinally and laterally and communicated with the water outlet and the through-hole.

Further, the connection portion is provided with a latticed texture.

Technical solutions of the present application have the following advantages.

1. According to the flat membrane support plate provided by the present application, an interior area of the flat membrane support plate is opened with holes to form a honeycomb structure, so that the whole support plate can maintain high stability and support strength. Thus, the influence on the rigidity of the support plate due to many openings is reduced. The honeycomb structure cooperates with the support portion arranged between the honeycomb structural portion and the connection portion can significantly improve the supporting strength of the flat membrane support plate. Therefore, the possibility of warping and deformation is greatly reduced when the flat membrane support plate has a thickness value of 5-6 mm, and the area of openings can be increased to 70%. The increase of the opening area can not only reduce the material required for the processing of the support plates, save the processing cost, and when the hollow area of the honeycomb structure occupies 30-70% of the whole area of the support body, the corresponding production cost can be saved by 20-50%, and at the same time, the costs such as transportation and hoisting can also be saved. Furthermore, a first flow channel communicated with through-holes of adjacent honeycomb cells is arranged on the honeycomb cell. As a result, the single honeycomb cell can be communicated with the through-hole through the first flow channel. Furthermore, front and back surfaces of the entire honeycomb structural portion is penetrating with each other, and the honeycomb structural portion can be communicated with the water outlet, so as to form a smoother water outlet channel. The effluent can be guided out from the water outlet according to the minimum resistance. This facilitates inflow of liquid outside the flat membrane support plate to the interior of the membrane element, reduces the transmembrane pressure difference, mitigates membrane fouling, increases the membrane flux, reduces the pressure required for suction, and thereby greatly reducing the operating energy consumption of the system.

2. According to the flat membrane support plate provided by the present application, liquids in the through-holes of two adjacent honeycomb cells are communicated with each other through at least two first flow channels. A plurality of first flow channels communicate with each other, so that a flow resistance of the liquid can be reduced and circulation of the liquid can be accelerated without affecting the supporting strength, thereby further mitigating membrane fouling. Further, the first flow channel is arranged at a junction of the hole walls of adjacent honeycomb cells, so that the purpose of using one first flow channel to communicate with the through-holes of the plurality of adjacent honeycomb cells can be achieved, the whole honeycomb structural portion is smoother, and meanwhile, the influence on the firmness of the honeycomb structure and the rigidity of the support plate is reduced.

3. According to the flat membrane support plate provided by the present application, the first flow channel is arranged at the junction and is tapered in cross section, which can not only improve the strength of the support plate influenced by excessively large opening of the first flow channel, but also avoid the occurrence of increased flow resistance due to excessively small liquid flow channel, and thus guaranteeing a sufficient size of the liquid flow channel. The first flow channel can be of a through-hole or a groove. As for the first flow channel with a through-hole structure, a through-hole size of the first flow channel tapers inwardly from two sides of the flat membrane support plate and the first flow channel is penetrating, not only maintaining the supporting role of the honeycomb structural portion at the junction, but also further balancing the pressure on the two sides of the flat membrane.

4. According to the flat membrane support plate provided by the present application, a second flow channel arranged on the support portion is staggered longitudinally and laterally and communicated with the water outlet and the through-hole, so that liquids on both sides of the support portion can communicate with each other, thereby facilitating balancing of the pressure on both sides of the support portion, further mitigating membrane fouling, and preventing increase of local liquid flow resistance due to the fact that the liquid is intercepted by the support portion.

5. According to the flat membrane support plate provided by the present application, the support portion includes a plurality of support units of a cross-shaped structure or a hexagonal structure, which can improve the strength and rigidity of the whole support plate, and improve the situation of edge warping and deformation of the support plate in the using process due to the fact that the overall strength of the support plate is reduced by openings. Specifically, the supporting effect of the hexagonal support unit is particularly significant.

6. According to the flat membrane support plate provided by the present application, the reinforcing rib can not only strengthen the strength of the frame of the support plate but also isolate the connection portion from the honeycomb structural portion, and the connection portion from the support portion, thereby avoiding the situation that the honeycomb structural portion or the support portion is deformed by the heat and thus blocking the flow channel during welding.

BRIEF DESCRIPTION OF THE DRAWINGS

In order to illustrate the technical solutions in embodiments of the present application or the prior art more clearly, accompanying drawings needed in the embodiments or the prior art are illustrated briefly as follows.

DESCRIPTION OF THE EMBODIMENTS

Figure 1:
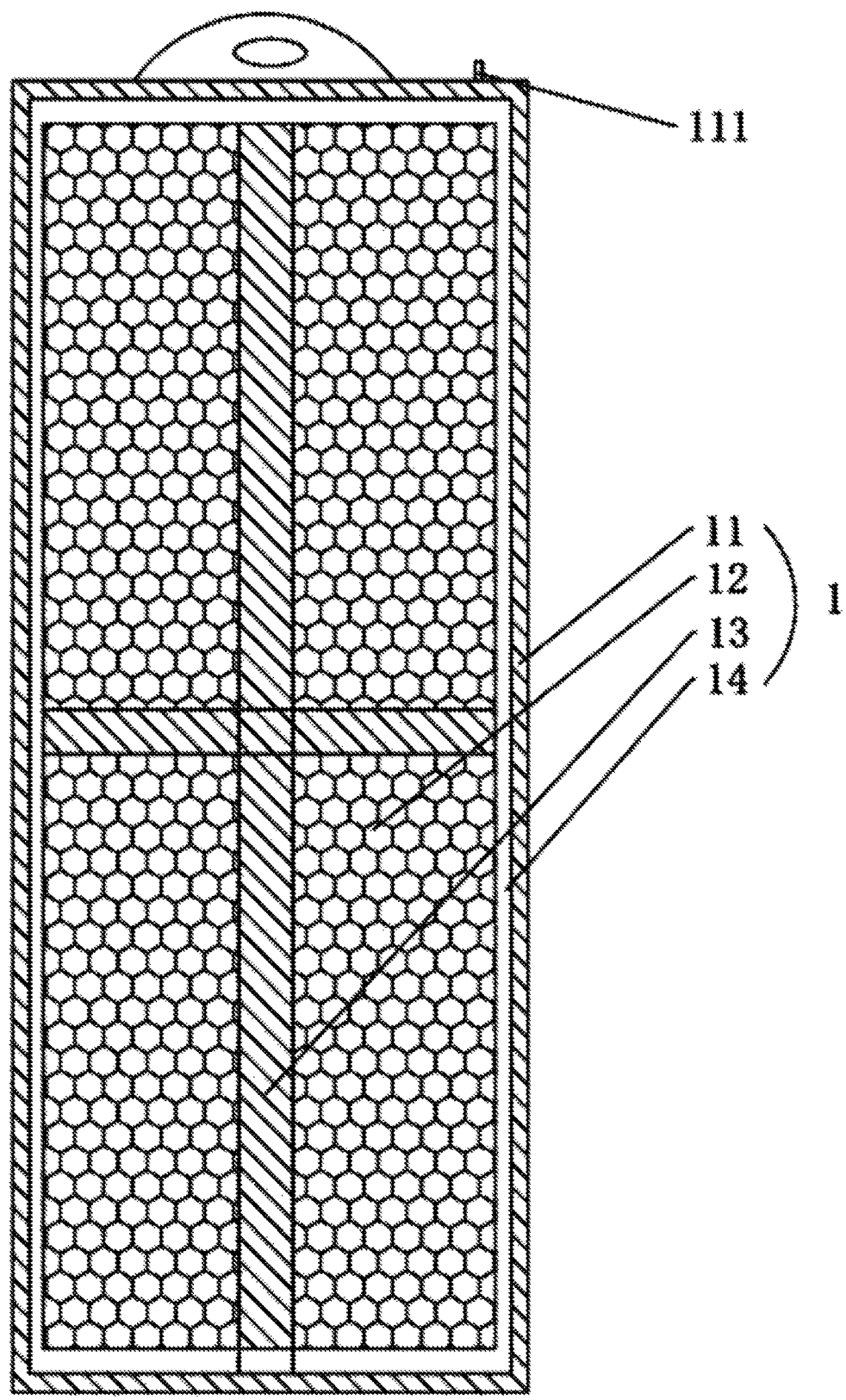
FIG. 1 is a schematic structural diagram of a flat membrane support plate according to an embodiment of the present application.

Based on the shortcomings in the prior art, in order to balance the transmembrane pressure difference on the two sides of the support plate, the Chinese patent document CN105984935A provides an MBR membrane element support plate which includes a groove flow channel communicated with a water outlet device, the groove flow channel includes support blocks with grooves, support strips connected with the support blocks, and hollowed-out areas arranged between the support strips and communicated with the grooves. However, on one hand, the MBR membrane element includes support blocks, grooves on the support strips and hollowed-out areas interconnected to each other to form liquid flow channels, and the opening areas of the hollowed-out areas are relatively small, so that the capacity of reducing the transmembrane pressure difference due to large liquid flow resistance in the actual use process is limited. The uniformity of water produced on the two sides of the support plate is improved by increasing the size of the opening, so that the transmembrane pressure difference is reduced, the stability of the whole structure is influenced, and the support plate is not firm or is easily warped and deformed.

Though theoretically, the disadvantages of upwarp deformation can be overcome by increasing the thickness of the support plate, the cost is increased greatly due to the fact that the thickness of the support plate is high, and application and popularization of the membrane bioreactor are affected. On the other hand, the thickness of the support plate is increased, the effective filtering area in unit volume is reduced (for identical component thickness, the number of sheets is decreased), and the weight is increased. Therefore, although the conventional support plate is easy to deform and warp in use, the thickness of the support plate in practical application mostly is 5-6 mm in combination with various factors, and therefore, the described disadvantages are difficult to overcome. The cost is high when the flat membrane element support plate is thick, and the flat membrane element is easily to be deformed and warped during use, which present a formidable barrier to use an immersive flat membrane assembly.

Therefore, it is quite necessary to improve the structure of the support plate and reduce the trans-membrane pressure difference, on the premise that the supporting strength and rigidity of the support plate are guaranteed and the machining cost of the support plate is not increased.

The technical solutions in the embodiments of the present application are hereinafter described clearly and completely with reference to the accompanying drawings. Obviously, the embodiments described here are part of the embodiments of the present application and not all of the embodiments. All other embodiments obtained by persons skilled in the art based on the embodiments of the present application without creative efforts shall fall within the protection scope of the present application.

It should be understood that, terms used for describing the present application, such as "inner", "outer", "upper" and "lower", show orientation or position relationship based on the accompanying drawings, are only used to simplify description of the present application, and do not indicate or imply that the device or element referred to must have a particular orientation, or be configured and operated in a particular orientation, and thus do not to be construed as limiting the present application. In addition, terms used for "joined", "connected" should be broadly interpreted, for example, it can be fixedly connected, or removably connected, or integrally connected; and it can be connected directly or through an intermediate or communicated between two elements. Persons skilled in the art can understand specific meanings of the above terms in the present application depending on specific situations.

A flat membrane support plate is as shown in FIG. 1, the flat membrane support plate 1 includes a connection portion 11, a honeycomb structural portion 12 and a support portion 13. The connection portion 11 is arranged at a periphery of the flat membrane support plate 1, for connecting a diaphragm to the flat membrane support plate 1 in a sealing manner, for example, by welding or bonding in the prior art. The diaphragm can be connected to the connection portion 11 in a sealing manner. The connection portion 11 is provided with at least one water outlet 111. Both the front and back surfaces of the connection portion 11 can be provided with a latticed texture, so as to enhance the welding strength of the support plate and the diaphragm. The honeycomb structural portion 12 is arranged on the flat membrane support plate 1 in an area enclosed by the connection portion 11, and a hollow area of the honeycomb structural portion 12 occupies 30-70% of an entire area of the flat membrane support plate 1, so that the usage amount of the machining materials can be reduced and costs can be reduced, and meanwhile, the situation of deformation or warping is unlikely to occur. The support portion 13 is arranged between the honeycomb structural portion 12 and the connection portion 11, for reinforcing the honeycomb structural portion 12, and thereby enhancing the strength of the support plate.

Figure 2:
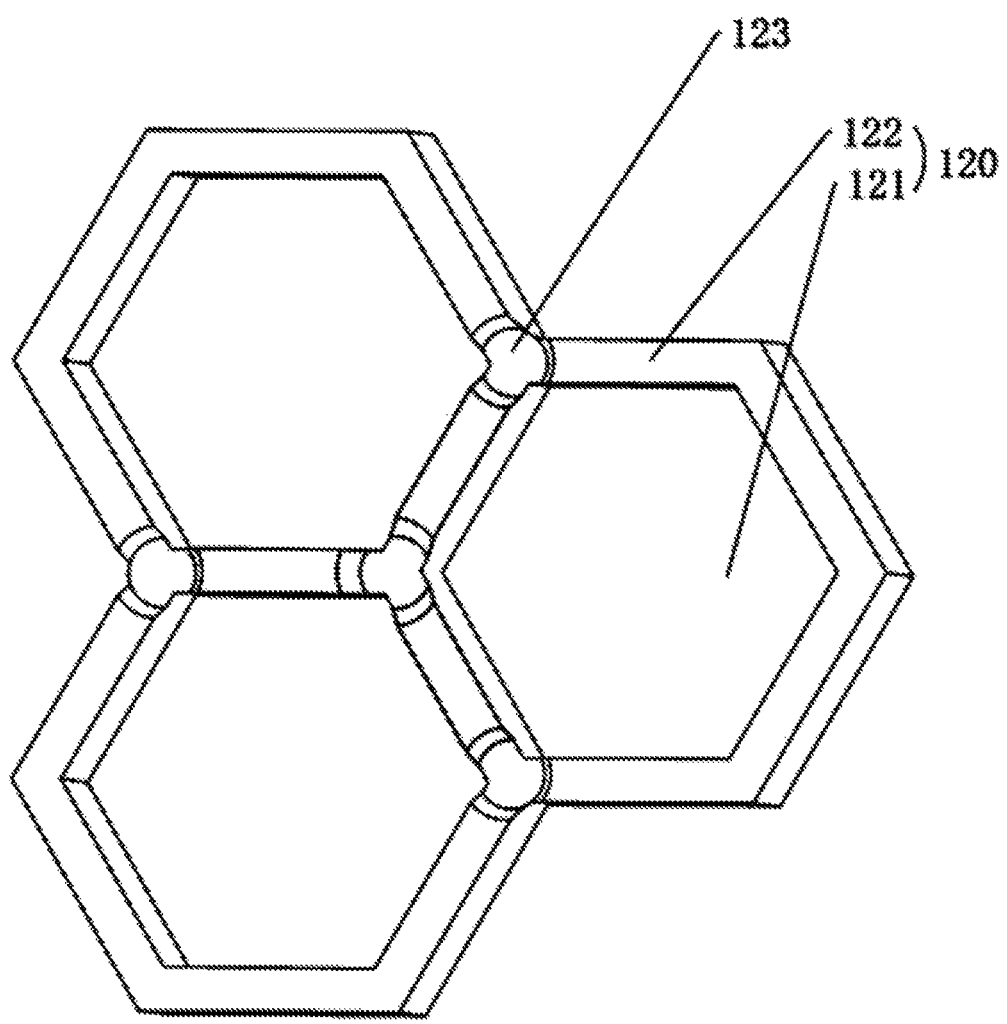
FIG. 2 is a schematic structural diagram of a honeycomb structural portion according to an embodiment of the present application.

Specifically, as shown in FIG. 2, the honeycomb structural portion 12 includes a plurality of honeycomb cells 120 with regular shapes. The honeycomb cell 120 includes a through-hole 121 formed inside thereof, and a hole wall 122. An outer periphery of the hole wall 122 forms the through-hole 121 and separates adjacent through-holes 121. The honeycomb cell 120 is provided with a first flow channel 123, and the first flow channel 123 is communicated with through-holes 121 of adjacent honeycomb cells 120, communicated with an interior of the entire honeycomb structural portion 12 and communicated the honeycomb structural portion 12 with the water outlet 111. As a result, the single honeycomb cell 120 can be communicated with the through-hole 121 through the first flow channel 123, furthermore, front and back surfaces of the entire honeycomb structural portion 12 is penetrating with each other, and the honeycomb structural portion 12 can be communicated with the water outlet 111, so as to form a smoother water outlet channel. This facilitates inflow of liquid outside the flat membrane support plate 1 to the interior of the membrane element, reduces the transmembrane pressure difference, mitigates membrane fouling, increases the membrane flux, reduces the pressure required for suction, and thereby greatly reducing the operating energy consumption of the system.

Further, the first flow channel 123 is arranged on the hole wall 122 of the honeycomb cell 120. Liquids in the through-holes 121 of two adjacent honeycomb cells 120 are communicated with each other through at least two first flow channels 123. A plurality of first flow channels 123 communicate with each other, so that a flow resistance of the liquid can be reduced and circulation of the liquid can be accelerated without affecting the supporting strength, thereby further mitigating membrane fouling. In this embodiment, liquids in the through-holes 121 of two adjacent honeycomb cells 120 are communicated with each other through at least two first flow channels 123.

Further, the first flow channel 123 is arranged at a junction of the hole walls 122 of adjacent honeycomb cells 120, so that the purpose of using one first flow channel 123 to communicate with the through-holes 121 of the plurality of adjacent honeycomb cells 120 can be achieved, the whole honeycomb structural portion 12 is smoother, and meanwhile, the influence on the firmness of the honeycomb structure and the rigidity of the support plate is reduced.

In some embodiments of the present application, the honeycomb cell 120 has a regular hexagonal, rectangular or diamond cross section. In this embodiment, the honeycomb cell 120 has a regular hexagonal cross section, and the first flow channel 123 is arranged at a junction of hole walls 122 of three adjacent honeycomb cells 120. Liquids in the through-holes 121 of the three honeycomb cells 120 which shares one junction are communicated with each other through the first flow channel 123. When the honeycomb cell 120 has a rectangular or diamond cross section, the first flow channel 123 is arranged at a junction of hole walls 122 of four adjacent honeycomb cells 120.

Further, the first flow channel 123 is tapered in cross section, and an opening of the first flow channel 123 tapers inwardly from a surface of the flat membrane support plate 1, which can not only improve the strength of the support plate influenced by excessively large opening of the first flow channel 123, but also avoid the occurrence of increased flow resistance due to excessively small liquid flow channel, and thus guaranteeing a sufficient size of the liquid flow channel.

Besides, the first flow channel 123 can be of a through-hole structure or a groove structure. In this embodiment, the first flow channel 123 is of a groove structure, a groove of the first flow channel 123 tapers inwardly from two sides of the flat membrane support plate 1 and the first flow channel 123 is not penetrating, which can improve the supporting role of the honeycomb structural portion 12 at the junction. In terms of the first flow channel 123 with a through-hole structure, a through-hole size of the first flow channel 123 tapers inwardly from two sides of the flat membrane support plate 1 and the first flow channel 123 is penetrating to form an hourglass-shaped structure, not only maintaining the supporting role of the honeycomb structural portion 12 at the junction, but also further balancing the pressure on the two sides of the flat membrane.

Further, the support portion 13 includes a plurality of support units with regular shapes, the support unit is provided with a second flow channel, staggered longitudinally and laterally and communicated with the water outlet 111 and the through-hole 121.

In some embodiments, as shown in FIG. 1, as a specific embodiment of the support portion 13, the support unit is of a cross-shaped structure, and includes a plurality of transverse barriers and a plurality of longitudinal barriers dividing the honeycomb structural portion 12 into a plurality of honeycombs. The cross-shaped support portion 13 can improve the strength and rigidity of the whole support plate, and improve the situation of edge warping and deformation of the support plate in the using process due to the fact that the overall strength of the support plate is reduced by openings.

Figure 4:
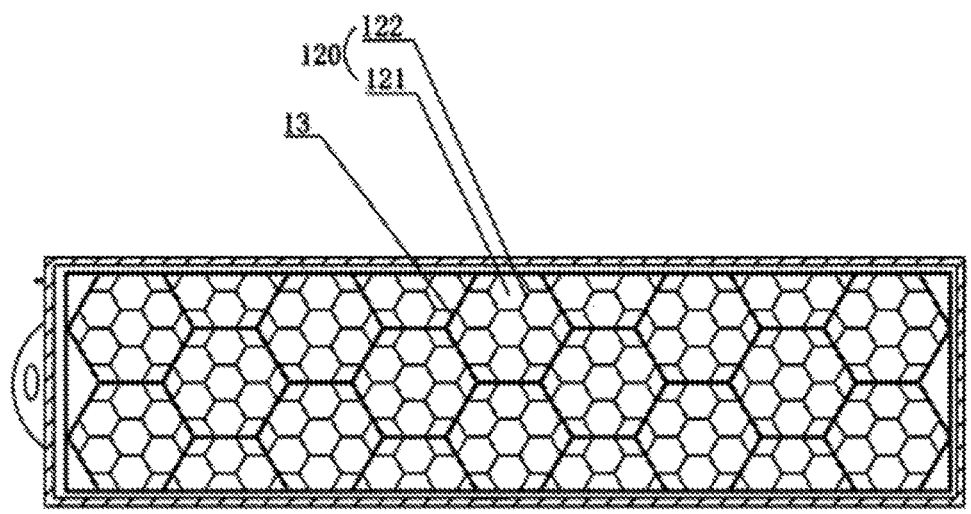
FIG. 4 is a schematic structural diagram of a flat membrane support plate according to another embodiment of the present application.

As shown in FIG. 4, as another specific embodiment of the support portion 13, the support unit has a hexagonal or a semi-hexagonal cross section, and a plurality of honeycomb cells 120 are partially or entirely nested in the support portion 13. The hexagonal or a semi-hexagonal support portion 13 can improve the strength and rigidity of the whole support plate, and improve the situation of edge warping and deformation of the support plate in the using process due to the fact that the overall strength of the support plate is reduced by openings.

Figure 3:
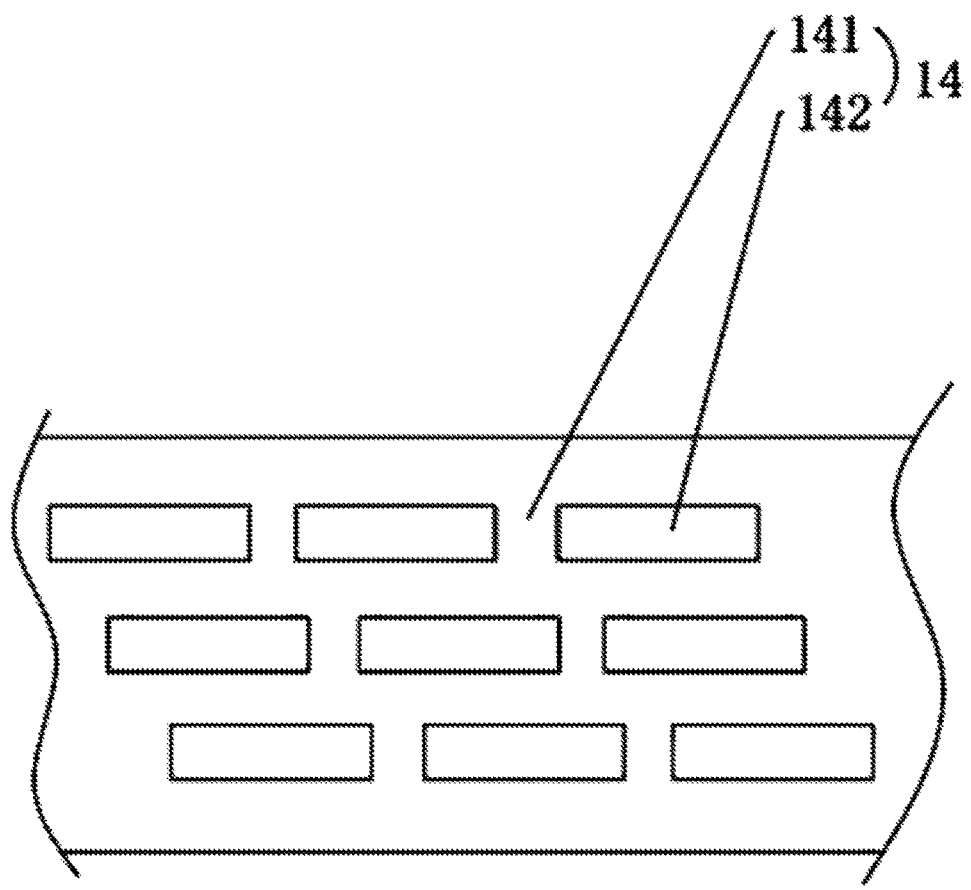
FIG. 3 is a schematic structural diagram of a reinforcing rib according to an embodiment of the present application.

Besides, a s shown in FIG. 3, a reinforcing rib 14 is further provided between an inner circumference of the connection portion 11 and an outer circumference of the honeycomb structural portion 12, and the reinforcing rib 14 is provided with protrusions 142 and a third flow channel 141 between the protrusions 142, staggered longitudinally and laterally and communicated with the water outlet 111 and the through-hole 121.

Further, the connection portion 11 is provided with a latticed texture.

Specifically, the flat membrane support plate 1 in this embodiment is a single-shot injection molded ABS plate, and such a flat membrane support plate 1 is non-symmetrically arranged.

Further, the first flow channel 123, the second flow channel and the third flow channel 141 can be arranged in a staggered manner on the front and back surfaces, and ensure that the resistance of the two surfaces is consistent.

Obviously, the embodiments described above are merely examples made for clarity, and are not limited to the embodiments. Other variations or alterations in different forms can also be made by persons skilled in the art on the basis of the above description. All embodiments need not be exhaustive or otherwise impossible to be exhaustive herein. While obvious variations or alterations hereby incorporated are still within the protection scope of the present application.

What is claimed is:

1. A flat membrane support plate, comprising:
a connection portion configured to connect a diaphragm to the flat membrane support plate in a sealing manner, wherein the connection portion is arranged at a periphery of the flat membrane support plate and provided with at least one water outlet;
a honeycomb structural portion arranged on the flat membrane support plate in an area enclosed by the connection portion, wherein the honeycomb structural portion is provided with a first flow channel for communicating with an interior of the entire honeycomb structural portion and communicating the honeycomb structural portion with the at least one water outlet, and a hollow area of the honeycomb structural portion occupies 30-70% of an entire area of the flat membrane support plate; and
a support portion configured for reinforcing the honeycomb structural portion and arranged between the honeycomb structural portion and the connection portion,
wherein the honeycomb structural portion comprises a plurality of honeycomb cells, each of the honeycomb cells comprises a through-hole and a hole wall, the through-hole is formed inside the honeycomb cell and formed by an outer periphery of the hole wall, adjacent through-holes are separated by the hole walls, and the first flow channel is arranged on the hole wall of each of the honeycomb cells, and
wherein the first flow channel is arranged at a junction of the hole walls of adjacent honeycomb cells, and liquids in the through-holes of two adjacent honeycomb cells are in communication with each other through at least two first flow channels.

2. The flat membrane support plate according to claim 1, wherein the first flow channel is a tapered through-hole or a tapered groove, and an opening of the first flow channel tapers inwardly from a surface of the flat membrane support plate.

3. The flat membrane support plate according to claim 1, wherein:
   each of the honeycomb cells has a regular hexagonal cross section, and the first flow channel is arranged at a junction of the hole walls of three adjacent honeycomb cells; or
   the honeycomb cell is a honeycomb-like cell having a rectangular or diamond cross section, and the first flow channel is arranged at a junction of hole walls of four adjacent honeycomb cells.

4. The flat membrane support plate according to claim 3, wherein the support portion comprises at least one support unit, the at least one support unit is provided with a second flow channel staggered longitudinally and laterally and in communication with the water outlet and the through-hole, and the at least one support unit divides the honeycomb structural portion into a plurality of honeycombs in communication with each other.

5. The flat membrane support plate according to claim 4, wherein the at least one support unit is a cross-shaped structure, and the at least one support unit comprises a transverse barrier and a longitudinal barrier.

6. The flat membrane support plate according to claim 4, wherein the at least one support unit has a hexagonal or a semi-hexagonal cross section, and the plurality of honeycomb cells are partially or entirely nested in the support portion.

7. The flat membrane support plate according to claim 1 wherein a reinforcing rib is further provided between an inner circumference of the connection portion and an outer circumference of the honeycomb structural portion, and the reinforcing rib is provided with a third flow channel staggered longitudinally and laterally and in communication with the water outlet and the through-hole.

8. The flat membrane support plate according to claim 1, wherein the connection portion is provided with a latticed texture.

9. A flat membrane support plate, comprising:
   a connection portion configured to connect a diaphragm to the flat membrane support plate in a sealing manner, wherein the connection portion is arranged at a periphery of the flat membrane support plate and provided with at least one water outlet;
   a honeycomb structural portion arranged on the flat membrane support plate in an area enclosed by the connection portion, wherein the honeycomb structural portion is provided with a first flow channel for communicating with an interior of the entire honeycomb structural portion and communicating the honeycomb structural portion with the at least one water outlet, and a hollow area of the honeycomb structural portion occupies 30-70% of an entire area of the flat membrane support plate; and
   a support portion configured for reinforcing the honeycomb structural portion and arranged between the honeycomb structural portion and the connection portion,
   wherein the honeycomb structural portion comprises a plurality of honeycomb cells, each of the honeycomb cells comprises a through-hole and a hole wall, the through-hole is formed inside the honeycomb cell and formed by an outer periphery of the hole wall, adjacent through-holes are separated by the hole walls, and the first flow channel is arranged on the hole wall of each of the honeycomb cells, and
   wherein a reinforcing rib is further provided between an inner circumference of the connection portion and an outer circumference of the honeycomb structural portion, and the reinforcing rib is provided with a third flow channel staggered longitudinally and laterally and in communication with the water outlet and the through-hole.

* * * * *